(12) United States Patent
Johnson et al.

(10) Patent No.: US 10,235,156 B2
(45) Date of Patent: Mar. 19, 2019

(54) VERSIONED EXTENSION POINTS OF GRAPHICAL USER INTERFACES

(71) Applicant: HEWLETT PACKARD ENTERPRISE DEVELOPMENT LP, Houston, TX (US)

(72) Inventors: Christopher Johnson, Fort Collins, CO (US); Peter Choi, Sunnyvale, CA (US); Jason Miller, Fort Collins, CO (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/366,567

(22) Filed: Dec. 1, 2016

(65) Prior Publication Data
US 2018/0157477 A1    Jun. 7, 2018

(51) Int. Cl.
| | |
|---|---|
| *G06F 9/45* | (2006.01) |
| *G06F 8/65* | (2018.01) |
| *G06F 8/71* | (2018.01) |
| *G06F 3/0484* | (2013.01) |

(52) U.S. Cl.
CPC .............. *G06F 8/65* (2013.01); *G06F 3/0484* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 5,291,585 | A * | 3/1994 | Sato | G06F 9/4411 710/10 |
| 5,600,778 | A * | 2/1997 | Swanson | G06F 3/033 715/762 |
| 5,675,520 | A * | 10/1997 | Pitt, III | G06F 3/0481 703/23 |
| 6,006,279 | A * | 12/1999 | Hayes | G06F 9/451 719/328 |
| 6,628,305 | B1 * | 9/2003 | Hong | G06F 9/451 715/734 |
| 7,596,611 | B1 * | 9/2009 | Satish | H04L 29/08729 709/223 |
| 7,673,299 | B2 * | 3/2010 | Bennett | G06F 9/454 717/168 |
| 7,917,855 | B1 * | 3/2011 | Satish | G06F 9/451 715/744 |
| 8,375,381 | B1 * | 2/2013 | Clark | G06F 8/71 717/170 |
| 8,856,740 | B2 * | 10/2014 | Wilson | G06F 9/44552 717/103 |

(Continued)

OTHER PUBLICATIONS

Wermelinger, Michel, and Yijun Yu. "Analyzing the evolution of eclipse plugins." Proceedings of the 2008 international working conference on Mining software repositories. ACM, 2008. (Year: 2008).*

(Continued)

*Primary Examiner* — Matthew J Brophy

(57) ABSTRACT

In some examples, version data in an extension point of a graphical user interface of a version of a software application may be identified. In some examples, based on the identified version data, a version of a user interface module available to integrate with the user interface of the version of the software application may be determined.

20 Claims, 4 Drawing Sheets

(56) References Cited

U.S. PATENT DOCUMENTS

| | | | |
|---|---|---|---|
| 8,972,934 B2* | 3/2015 | Driesen | G06F 9/541 709/203 |
| 9,122,561 B2* | 9/2015 | Dhoolia | G06F 8/72 |
| 9,405,532 B1* | 8/2016 | Sullivan | G06F 8/71 |
| 9,898,279 B2* | 2/2018 | Eberlein | G06F 8/30 |
| 10,129,344 B2* | 11/2018 | Pogrebinsky | H04L 67/20 |
| 2002/0052910 A1* | 5/2002 | Bennett | G06F 9/454 718/104 |
| 2005/0033763 A1* | 2/2005 | Chen | G06F 9/451 |
| 2005/0157321 A1* | 7/2005 | Alacar | G06F 9/4411 358/1.13 |
| 2005/0198610 A1* | 9/2005 | Fildebrandt | G06F 8/38 717/100 |
| 2006/0225068 A1* | 10/2006 | Bennett | G06F 9/454 717/168 |
| 2007/0260629 A1* | 11/2007 | Tseitlin | G06F 8/20 |
| 2008/0196010 A1* | 8/2008 | Raghavan | H04L 67/34 717/121 |
| 2009/0217182 A1* | 8/2009 | Grechanik | G06F 8/38 715/762 |
| 2010/0058365 A1* | 3/2010 | DeFore | G06F 9/44526 719/329 |
| 2010/0169805 A1* | 7/2010 | Wilson | G06F 9/451 715/762 |
| 2010/0287529 A1* | 11/2010 | Costa | G06F 8/34 717/105 |
| 2012/0079383 A1* | 3/2012 | Thanumalayan | G06F 8/65 715/716 |
| 2013/0055232 A1* | 2/2013 | Rajan | G06F 8/658 717/170 |
| 2014/0201803 A1* | 7/2014 | Patil | G06F 9/44505 726/1 |
| 2015/0089476 A1* | 3/2015 | Dhoolia | G06F 8/71 717/122 |
| 2015/0205594 A1* | 7/2015 | Pruessmann | G06F 8/65 717/170 |
| 2016/0162286 A1* | 6/2016 | Bankole | G06F 8/71 717/170 |
| 2016/0283228 A1* | 9/2016 | Sullivan | G06F 8/71 |
| 2017/0006119 A1* | 1/2017 | Pogrebinsky | H04L 67/20 |
| 2017/0177671 A1* | 6/2017 | Allgaier | G06F 8/30 |
| 2017/0286067 A1* | 10/2017 | Eberlein | G06F 8/30 |
| 2018/0157477 A1* | 6/2018 | Johnson | G06F 8/65 |

OTHER PUBLICATIONS

Gruber, Olivier, et al. "The Eclipse 3.0 platform: adopting OSGi technology." IBM Systems Journal 44.2 (2005): 289-299. (Year: 2005).*

* cited by examiner

VERSIONED EXTENSION POINTS OF GRAPHICAL USER INTERFACES

BACKGROUND

A graphical user interface (GUI) is a user interface allowing interaction by a user with a computing device. A GUI may display graphical icons, visual indicators, text, input fields, metric data relating to metrics, etc.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Software applications, after being installed, may be customized to suit a user's preferences. Such customization may include adjustments to the GUI such as changes to logos or colors of user interface modules. Customization may also involve changes to more complex functions and features of the software applications. However, once a software application has been customized by a user, upgrades to the software application may cause customizations to be lost in the new version of the software application. To deal with this issue, after an upgrade to a new version, customizations may be manually re-installed, which may be time consuming and costly. In some examples, customization may also cause difficulty in the upgrade process. Therefore, maintaining customization and up-to-date versions of software applications efficiently may present a challenge.

Accordingly, the present disclosure provides examples in which customizations may be provided in graphical user interfaces of software applications using user interface modules that integrate with extension points associated with the graphical user interfaces. An "extension point" is code defining an interface between a software application and a user interface module. A "user interface module" is a module that adds additional functionality to a graphical user interface of a software application. Extension points allow for modularity and customizability in software applications. The extension points in each version of the software application may include version data that may be updated in each version of the software application is upgraded. Therefore, in some examples, the extension points may allow for tracking when an upgraded user interface module is available for integration and installing (e.g. automatically) the upgraded user interface modules such that user customizations can be maintained.

Figure 1:
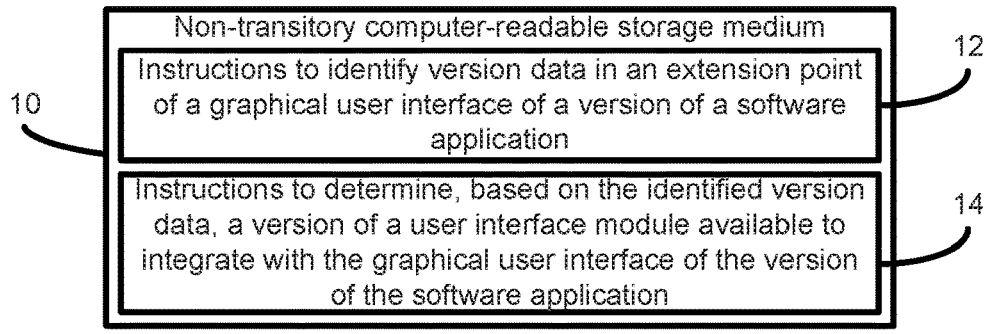
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to identify version data in an extension point of a graphical user interface of a version of a software application. The non-transitory computer readable storage medium 10 may include instructions 14 executable by a processor to determine, based on the identified version data, a version of a user interface module available to integrate with the graphical user interface of the version of the software application.

Figure 2:
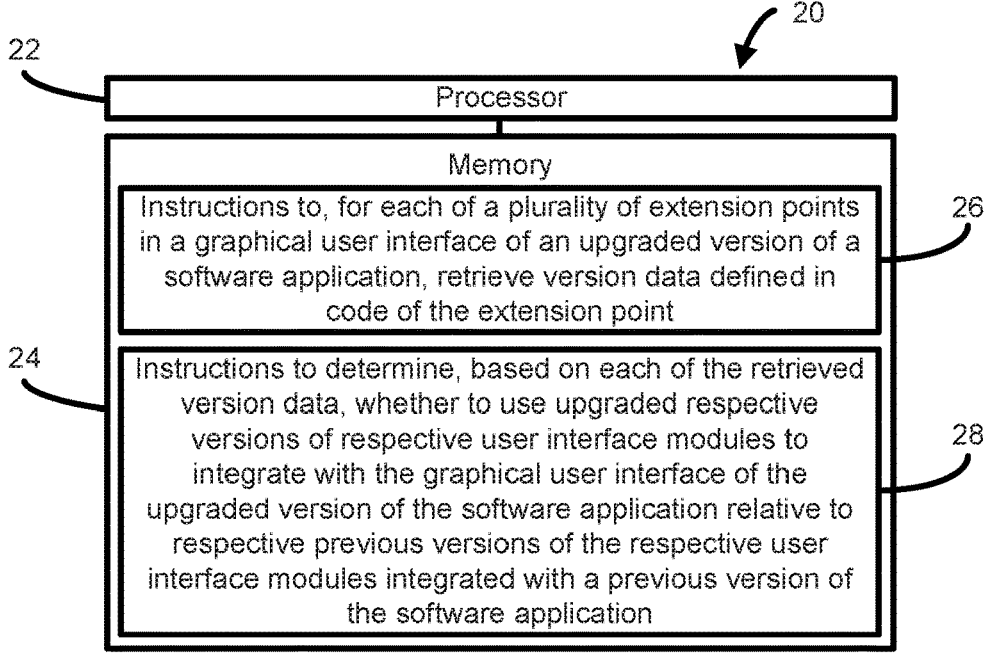
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor 22 to, for each of a plurality of extension points in a graphical user interface of an upgraded version of a software application, retrieve version data defined in code of the extension point. The memory 24 may include instructions 28 executable by the processor 22 to determine, based on each of the retrieved version data, whether to use upgraded respective versions of respective user interface modules to integrate with the graphical user interface of the upgraded version of the software application relative to respective previous versions of the respective user interface modules integrated with a previous version of the software application.

Figure 3:
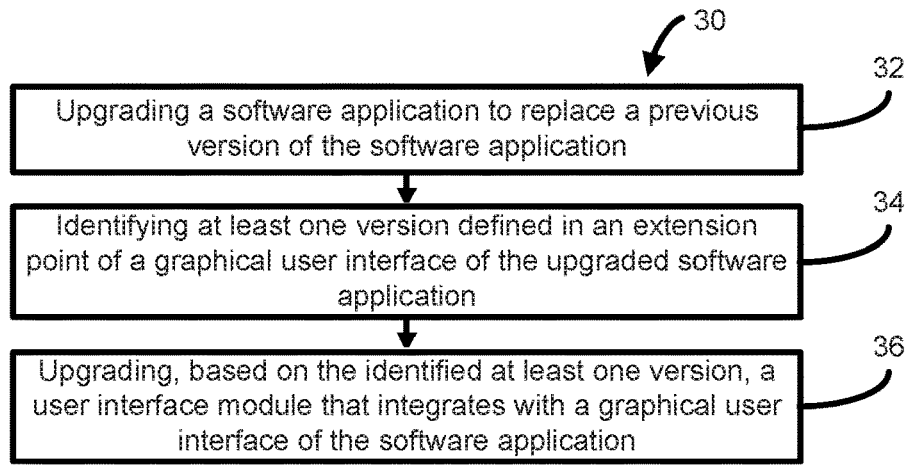
FIGS. 3 and 7 are flow diagrams illustrating methods according to some examples.

FIG. 3 is a flow diagram illustrating a method 30 according to some examples. The following may be performed by a processor. The method 30 may include: at 32, upgrading a software application to replace a previous version of the software application; at 34, identifying at least one version defined in an extension point of a graphical user interface of the upgraded software application; and at 36, upgrading, based on the identified at least one version, a user interface module that integrates with a graphical user interface of the software application.

Figure 4:
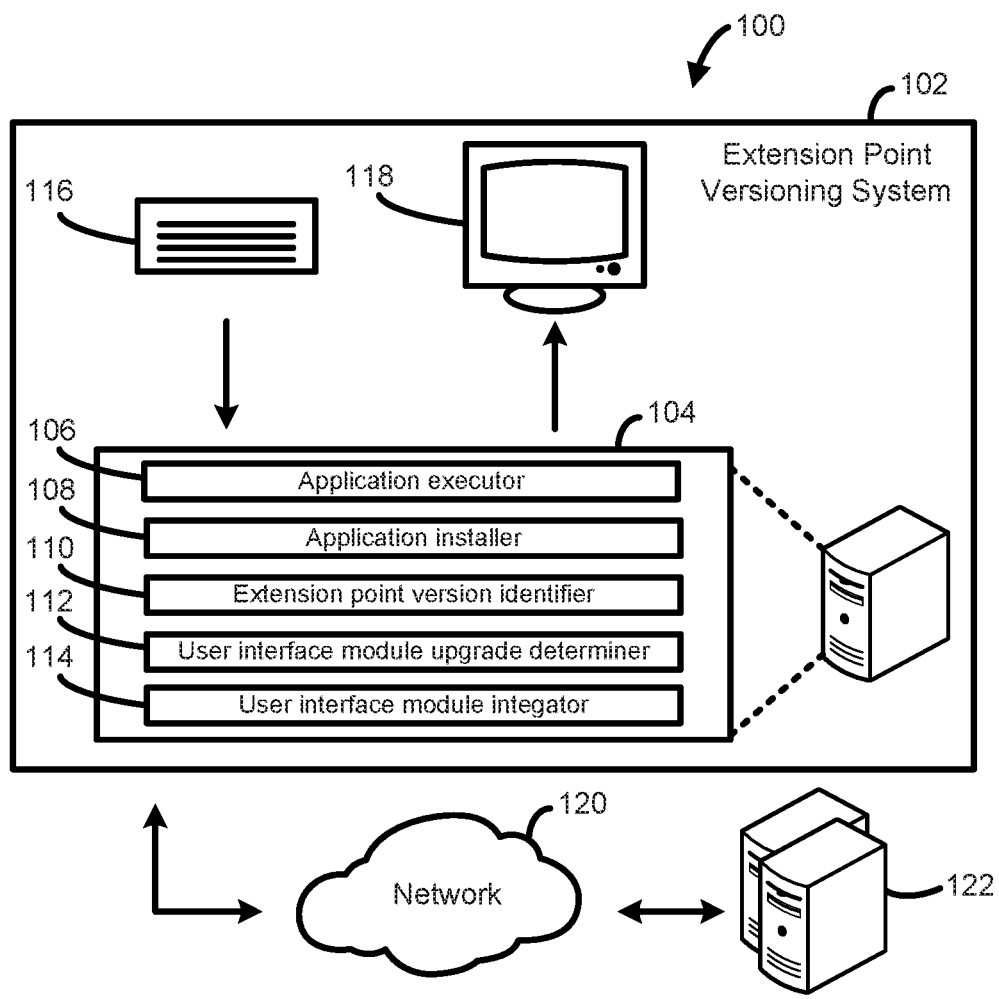

FIG. 4 is a block diagram illustrating a system 100 according to some examples.

The system 100 includes a network 120, such as a local area network (LAN), wide area network (WAN), the Internet, or any other network. The system 100 may include an extension point versioning system 102 in communication with the network 120. The extension point versioning system 102 may be implemented as a computing device, such as a mobile computing device (e.g. smart phone or tablet), laptop computer, desktop computer, server, or other type of computing device. The system 100 may include additional computing devices 122 (e.g. servers) in communication with the network 120.

The extension point versioning system 102 may include various engines 104. These engines 104 may include an application executor 106, application installer 108, extension point version identifier 110, user interface module upgrade determiner 112, and user interface module integrator 114. The extension point versioning system 102 may support direct user interaction. For example, the extension point versioning system 102 may include user input device 116, such as a keyboard, touchpad, buttons, keypad, dials, mouse, track-ball, card reader, or other input devices. Additionally, the extension point versioning system 102 may include output device 118 such as a liquid crystal display (LCD), video monitor, touch screen display, a light-emitting diode (LED), or other output devices. The output devices may be responsive to instructions to display textual information and/or graphical data.

In some examples, each of the engines 104 may be implemented as a computing system including a processor, a memory such as non-transitory computer readable medium coupled to the processor, and instructions such as software and/or firmware stored in the non-transitory computer-readable storage medium. The instructions may be executable by the processor to perform processes discussed herein. In some examples, these components of the extension point versioning system 102 may include hardware features to perform processes described herein, such as a logical circuit, application specific integrated circuit, etc. In some examples, multiple engines 104 components may be implemented using the same computing system features or hardware, and in other examples, different computing systems may implement different engines 104.

The extension point versioning system 102 may host software applications. For example, the application executor 106 may store and execute these applications. The applications may include any types of applications, such as desktop or laptop applications, mobile applications, web applications, cloud based applications, on-premise applications, etc. In examples where applications include web applications, the extension point versioning system 102 may host web browsers, which may be used to display, to end users of the client computing devices, web pages via execution of web applications on the a web server. Initially, an older, previous version (e.g. version 1) of an application may be installed on the extension point versioning system 102.

Figure 5:
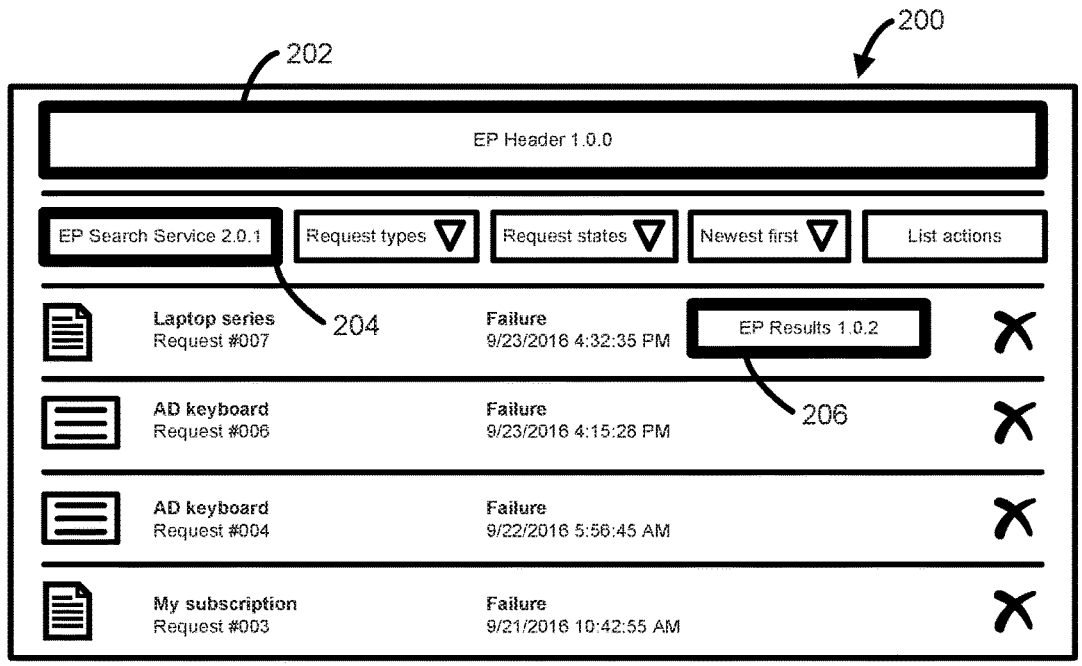
FIG. 5 is a screenshot of a graphical user interface of a previous version of a software application according to some examples.

FIG. 5 is a screenshot of a graphical user interface 200 of the previous version of a software application according to some examples. The output device 118 may be used to display the graphical user interface 200. In this example, the software application includes three extension points 202, 204, and 206. The extension point 202 integrates with a user interface module containing a header, and includes an ID representing that it integrates with the header user interface module. The extension point 204 integrates with a user interface module containing a search service, and includes an ID representing that it integrates with the search service user interface module. The extension point 206 integrates with a user interface module containing search results, and includes an ID representing that it integrates with the search results user interface module.

In some examples, each extension point 202, 204, and 206 may operate as an application programming interface (API), and may include a data interface for integrating with user interface modules. In some examples, the data interfaces and version data, which will be described, may be written in JSON. In addition to these features, the extension points 202, 204, and 206 may include a number of other features described below.

In some examples, each of the extension points 202, 204, and 206 may include, in their code, version data. The version data may include multiple versions. In the example of FIG. 5, the version data for each extension point 202, 204, and 206 includes three versions, and may be in a format represented by x.y.z. The extension points 202, 204, and 206 respectively have version data 1.0.0, 2.0.1, and 1.0.2.

The three versions may represent tiers of the version data, with the z component being most significant, the y component being next most significant, and the x component being the least significant. For example, if an upgrade occurs to version data 2.3.4 in the z component, then the version data may become 0.0.5 as the x and y component may be reset to 0. If an upgrade occurs to version data 2.3.4 in the y component, then the version data may become 2.4.0 as the x component may be reset to 0. If an upgrade occurs to version data 2.3.4 in the x component, then the version data may become 3.3.4.

In some examples, the most significant version in the z component represents an earliest version of a user interface module that is compatible with the extension point. That is, it represents when a backwards breaking change of the extension point has occurred such that the extension is no longer backward compatible with old versions of the user interface module, and such that the user interface module should be upgraded to conform to the extension point.

In some examples, the next most significant version in the y component represents a version of an available functionality upgrade for the user interface module. This component does not represent a backwards breaking change in the extension point.

In some examples, the least significant version in the x component represents an available bug fix for the user interface module. That is, the user interface module can be upgraded, wherein the upgraded version may include the bug fix. This component does not represent a backwards breaking change in the extension point.

In some examples, each extension point 202, 204, and 206 may define, in its code, a scope of data made available from the software application to the user interface module that integrates with the respective extension point. That is, an extension point may define which data may be passed, through the extension point, between the software application and user interface module. This definition may be created by explicitly listing types of data that may be passed through the extension point, or by explicitly listing types of data that may not be passed through to allow an inference that the types of data not listed may be passed through.

In some examples, each extension point 202, 204, and 206 may define, in its code, types of interactions between the software application and the user interface module that integrates with the respective extension point. That is, an extension point may define which types of interactions that may be permissible between the software application and the user interface module. This definition may be created by explicitly listing permissible types of interactions, or by explicitly listing impermissible types of interactions to allow an inference that the types of interactions not listed may be permissible.

In some examples, each extension point 202, 204, and 206 may define a visual property (e.g. size, color, shape, etc.) of the user interface module when it integrates with the extension point. In some examples, if the user interface module defines particular visual properties for itself that are in conflict with visual properties defined in the extension point, the visual properties in the extension point may override the visual properties defined by the user interface module. As shown in FIG. 5, the extension points 202, 204, and 206 define rectangular shapes for the respective user interface modules.

In some examples, as shown in FIG. 5, each extension point 202, 204, and 206 may define a location of the user interface module on the graphical user interface of the software application.

Turning back to FIG. 4, in some examples, the application installer 108 may install a new, upgraded version (e.g. version 2) of the software application to replace the previous version of the software application. In some examples, the application installer 108 may request the upgraded version of the software application through the network 120 from a computing device 122 such as a web server, and then install the application. Each part of the installation may be partially automated (with some involvement of a user) or completely automated (with no involvement of a user).

Figure 6:
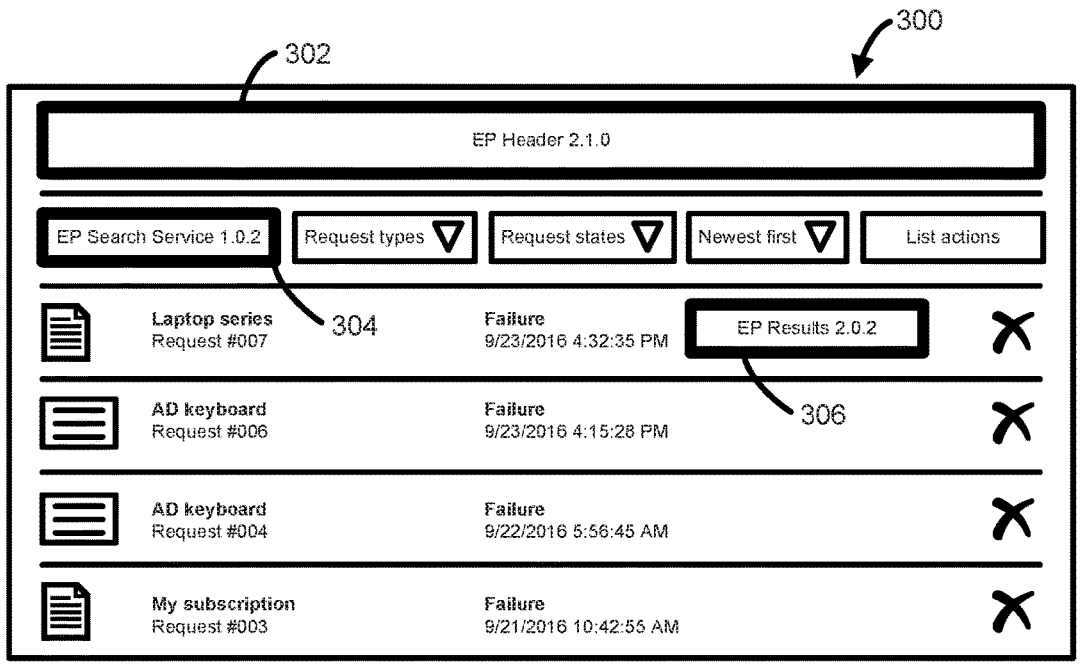
FIG. 6 is a screenshot of a graphical user interface of an upgraded version of a software application according to some examples.

FIG. 6 is a screenshot of a graphical user interface 300 of the upgraded version of a software application according to some examples. The output device 118 may be used to display the graphical user interface 300. The extension points 302, 304, and 306 may include similar features and functionalities as those implemented in extension points 202, 204, and 206, as described earlier. In this example, the software application includes three extension points 302, 304, and 306 which respectively have version data 2.1.0, 1.0.2, and 2.0.2, indicating that upgraded version data relative to the version data in the extension points 202, 204, and 206. Specifically, in extension point 302, an upgrade has occurred in the y component from 0 to 1 and then in the x component from 0 to 1 to 2. In extension point 304, an upgrade has occurred in the z component from 1 to 2 and then in the x component from 0 to 1 to 2. In extension point 306, an upgrade has occurred in the x component from 0 to 1.

In some examples, in response to the installation of the upgraded version of the software application, the extension point version identifier 110 may identify (e.g. retrieve) the version data in the extension points 302, 304, and 306.

In some examples, the user interface module upgrade determiner 112 may determine, based on the identified version data, a version of a user interface module available to integrate with the graphical user interface of the upgraded version of the software application. As discusser earlier, in each of the version data, the most significant version in the z component represents an earliest version of a user interface module that is compatible with the extension point, the next most significant version in the y component represents a version of an available functionality upgrade for the user interface module, and the least significant version in the x component represents an available bug fix for the user interface module.

For extension point 302, because an upgrade has occurred in the y component from 0 to 1 and then in the x component from 0 to 1 to 2, the user interface module upgrade determiner 112 may determine that an upgraded user interface module is available relative to the user interface module integrated with the extension point 202 of the previous version of the software application. Specifically, an available functionality upgrade and bug fixes may be available. An upgrade relative the user interface module integrated with the extension point 202 of the previous version of the software application is not mandatory because the z component in the version data has not changed, and therefore there has not been a backwards breaking change to the extension point 302. In this case, a user may be prompted on whether to request the upgraded version of the user interface module from a server 122 via the network 120, or install the same user interface module integrated with the extension point 202 of the previous version of the software application. The user may then input a selection into the input device 116.

For extension point 304, because an upgrade has occurred in the z component from 1 to 2 and then in the x component from 0 to 1 to 2, the user interface module upgrade determiner 112 may determine that an upgraded user interface module is available relative to the user interface module integrated with the extension point 204 of the previous version of the software application. Specifically, a backwards breaking change and bug fixes may be available. An upgrade relative the user interface module integrated with the extension point 204 of the previous version of the software application is mandatory because the z component in the version data has changed.

For extension point 306, because an upgrade has occurred in the x component from 0 to 1, the user interface module upgrade determiner 112 may determine that an upgraded user interface module is available relative to the user interface module integrated with the extension point 206 of the previous version of the software application. Specifically, a bug fix may be available. An upgrade relative the user interface module integrated with the extension point 206 of the previous version of the software application is not mandatory because the z component in the version data has not changed, and therefore there has not been a backwards breaking change to the extension point 306. In this case, a user may be prompted on whether to request the upgraded version of the user interface module from a server 122 via the network 120, or install the same user interface module integrated with the extension point 206 of the previous version of the software application. The user may then input a selection into the input device 116.

In some examples, when the version data in extension points of an upgraded version of a software application have not changed relative to version data in extension points of a previous version of the software application, the user interface module upgrade determiner 112 may determine that the user interface modules integrated with the extension points of the previous version of the software application may also be integrated with the extension points of the upgraded version of the software application. This is because the customizations reflected in the user interface modules would be expected to remain functional without any changes.

In some examples, the user interface module integrator 114 may integrate user interface modules with respective extension points 302, 304, and 306. For extension point 304, an upgraded user interface module may be integrated, and for extension points 203 and 306, either a previous or upgraded user interface module may be integrated depending on the user selections described earlier. Each part of the integration may be partially automated (with some involvement of a user) or completely automated (with no involvement of a user).

Figure 7:
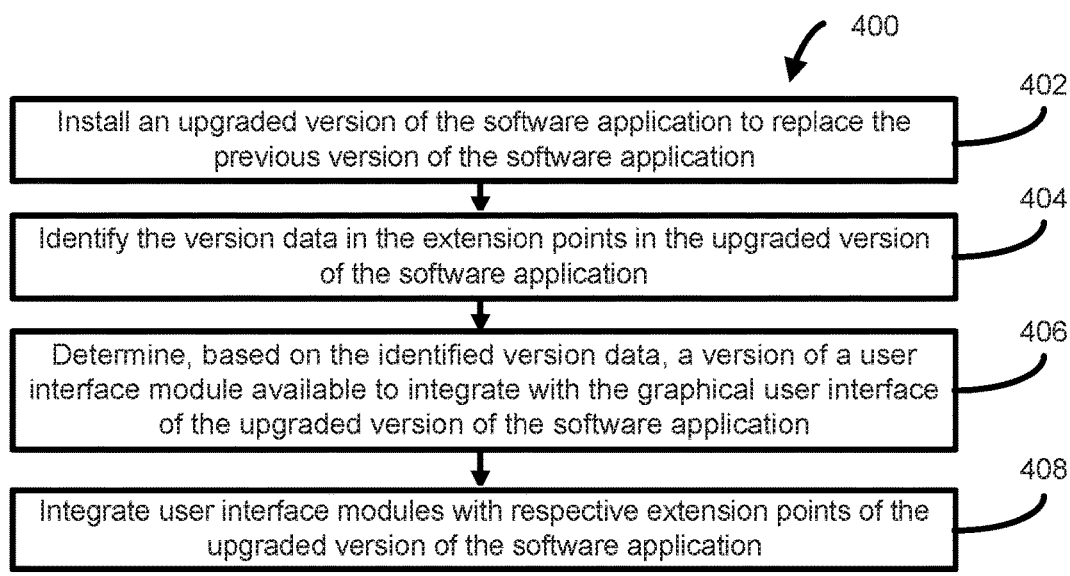

FIG. 7 is a flow diagram illustrating method 400 according to some examples. In some examples, the orderings shown may be varied, some elements may occur simultaneously, some elements may be added, and some elements may be omitted. In describing FIG. 7, reference will be made to elements described in FIGS. 4-6. In examples, any of the elements described earlier relative to FIGS. 4-6 may be implemented in the process shown in and described relative to FIG. 7.

At 402, the application installer 108 may install a new, upgraded version of the software application to replace the previous version of the software application. Any relevant processes previously described as implemented by the application installer 108 may be implemented at 402.

At 404, the extension point version identifier 110 may identify the version data in the extension points in the upgraded version of the software application. Any relevant processes previously described as implemented by the extension point version identifier 110 may be implemented at 404.

At 406, the user interface module upgrade determiner 112 may determine, based on the identified version data, a version of a user interface module available to integrate with the graphical user interface of the upgraded version of the software application. Any relevant processes previously described as implemented by the user interface module upgrade determiner 112 may be implemented at 406.

At 408, the user interface module integrator 114 may integrate user interface modules with respective extension points of the upgraded version of the software application. Any relevant processes previously described as implemented by the application installer 108 may be implemented at 408.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions that upon execution cause a system to:
   replace a first application version of a software application with a second application version of the software application;
   identify version data in an extension point in the second application version, the extension point comprising code defining an interface between the second application version and a user interface module (UIM) that adds functionality to a graphical user interface (GUI) of the software application, the version data comprising a first indicator to indicate an earliest version of the UIM that is compatible with the extension point, and a second indicator that represents a version of an upgrade for the UIM;
   responsive to the first indicator having a first value specifying that a version of the UIM available to integrate with the GUI of the second application version is different from a previous version of the UIM for the first application version, identify the version of the UIM different from the previous version of the UIM as a selected UIM version;
   responsive to the first indicator having a second value specifying that the version of the UIM available to integrate with the GUI of the second application version is the same as the previous version of the UIM, prompt a user to select the selected UIM version from among the previous version of the UIM and a version of the UIM indicated by the second indicator; and
   integrate the selected UIM with the GUI of the second application version.

2. The non-transitory computer-readable storage medium of claim 1, wherein the first indicator when set to the first value indicates that a backwards breaking change in the extension point in the second application version has occurred such that the extension is not backward compatible with the previous version of the UIM.

3. The non-transitory computer-readable storage medium of claim 2, wherein the first indicator is set to the first value responsive to the UIM for the second application version being an upgraded version relative to the previous version of the UIM for the first application version of the software application.

4. The non-transitory computer-readable storage medium of claim 1, wherein the second indicator of the version data represents a version of an available bug fix for the UIM.

5. The non-transitory computer-readable storage medium of claim 1, wherein the second indicator of the version data represents a version of an available functionality upgrade for the UIM.

6. The non-transitory computer-readable storage medium of claim 1, wherein the extension point defines a scope of data made available from the second application version of the software application to the UIM.

7. The non-transitory computer-readable storage medium of claim 1, wherein the extension point defines a type of interaction permissible between the second application version of the software application and the UIM.

8. The non-transitory computer-readable storage medium of claim 1, wherein the extension point defines a visual property of the UIM.

9. The non-transitory computer-readable storage medium of claim 1, wherein the extension point defines a location of the UIM on the GUI.

10. A system comprising:
    a processor; and
    a non-transitory storage medium comprising instructions executable on the processor to:
        upgrade a software application to replace a first application version of the software application with a second application version of the software application;
        in response to the upgrade, retrieve version data defined in code of an extension point in the second application version, the code defining an interface between the second application version and a user interface module (UIM) that adds functionality to a graphical user interface (GUI) of the software application, the version data comprising a first indicator to indicate an earliest version of the UIM that is compatible with the extension point, and a second indicator that represents a version of an upgrade for the UIM;
        responsive to the first indicator having a first value specifying that a version of the UIM available to integrate with the GUI of the second application version is different from a previous version of the UIM for the first application version, identify the version of the UIM different from the previous version of the UIM as a selected UIM version;

responsive to the first indicator having a second value specifying that the version of the UIM available to integrate with the GUI of the second application version is the same as the previous version of the UIM, prompt a user to select the selected UIM version from among the previous version of the UIM and a version of the UIM indicated by the second indicator; and integrate the selected UIM with the GUI of the second application version.

11. The system of claim 10, wherein the extension point defines a scope of data made available from the second application version of the software application to the UIM, and a type of interaction between the second application version of the software application and the UIM.

12. The system of claim 11, wherein the extension point defines a visual property and a location of the UIM.

13. A method comprising:
upgrading, by a system comprising a processor, a software application to replace a previous application version of the software application with an upgraded application version of the software application;

identifying, by the system, version data defined in an extension point in the upgraded application version, the extension point comprising code defining an interface between the upgraded application version and a user interface module (UIM) that adds functionality to a graphical user interface (GUI) of the software application;

responsive to the first indicator having a first value specifying that a version of the UIM available to integrate with the GUI of the upgraded application version is different from a previous version of the UIM for the previous application version, identifying, by the system, the version of the UIM different from the previous version of the UIM as a selected UIM version;

responsive to the first indicator having a second value specifying that the version of the UIM available to integrate with the GUI of the upgraded application version is the same as the previous version of the UIM, prompting, by the system, a user to select the selected UIM version from among the previous version of the UIM and a version of the UIM indicated by the second indicator; and integrating, by the system, the selected UIM with the GUI of the upgraded application version.

14. The method of claim 13, wherein the second indicator of the version data comprises version data of an available bug fix for the UIM, or version data of an available functionality upgrade for the UIM.

15. The non-transitory computer-readable storage medium of claim 2, wherein the first indicator when set to the second value indicates that the UIM for the second application version has not changed from the previous version of the UIM for the first application version.

16. The non-transitory computer-readable storage medium of claim 1, wherein the first indicator when set to the first value provides an indication that the previous version of the UIM is not compatible with the extension point in the second application version.

17. The system of claim 10, wherein the first indicator when set to the first value indicates that a backwards breaking change in the extension point in the second application version has occurred such that the extension is not backward compatible with the previous version of the UIM.

18. The system of claim 17, wherein the first indicator when set to the second value indicates that the UIM for the second application version has not changed from the previous version of the UIM for the first application version.

19. The method of claim 13, wherein the first indicator when set to the first value indicates that a backwards breaking change in the extension point in the upgraded application version has occurred such that the extension is not backward compatible with the previous version of the UIM.

20. The method of claim 19, wherein the first indicator when set to the second value indicates that the UIM for the upgraded application version has not changed from the previous version of the UIM for the previous application version.

* * * * *